Feb. 22, 1949.   M. F. BIRD   2,462,461
VACUUM JAR AND BOTTLE COMBINED
Filed Nov. 18, 1947

Inventor
Miles F. Bird
By Clarence A. O'Brien
and Harvey B. Jacobson
Attorneys

Patented Feb. 22, 1949

2,462,461

UNITED STATES PATENT OFFICE 2,462,461

VACUUM JAR AND BOTTLE COMBINED

Miles F. Bird, Cushing, Wis.

Application November 18, 1947, Serial No. 786,761

4 Claims. (Cl. 215—13)

The present invention relates to a novel combination vacuum bottle and jar which is adapted to conveniently store, for handy transportation and use, both liquid and solid foods and the object of the invention is to structurally, functionally and otherwise improve on similarly constructed multiple purpose Thermos containers.

It is generally well-known, by those conversant with the art to which the invention relates, that two-way and so-called two-in-one Thermos containers are not broadly new. Various styles and forms of dual containers which are mechanically interconnected for compactness and convenience have been devised and used. Manifestly, too, these types of containers are possessed of common characteristics, in that one container takes the form of a small mouthed bottle and the other, the form of a wide mouthed jar or jug. What is more, the containers are usually arranged in separable end-to-end relationship.

In carrying out the principles of the instant invention, I provide a similarly designed and constructed Thermos combination and rely for novelty on the specific details and their cooperative relation, in that they coact in providing a construction which, I believe, is more satisfactory and aptly suited to attain desired results.

Other advantages and objects of the invention will become more readily apparent from the following description and the accompanying illustrative drawings.

In the drawings, wherein like numerals are employed to designate like parts throughout the views.

Figure 2:
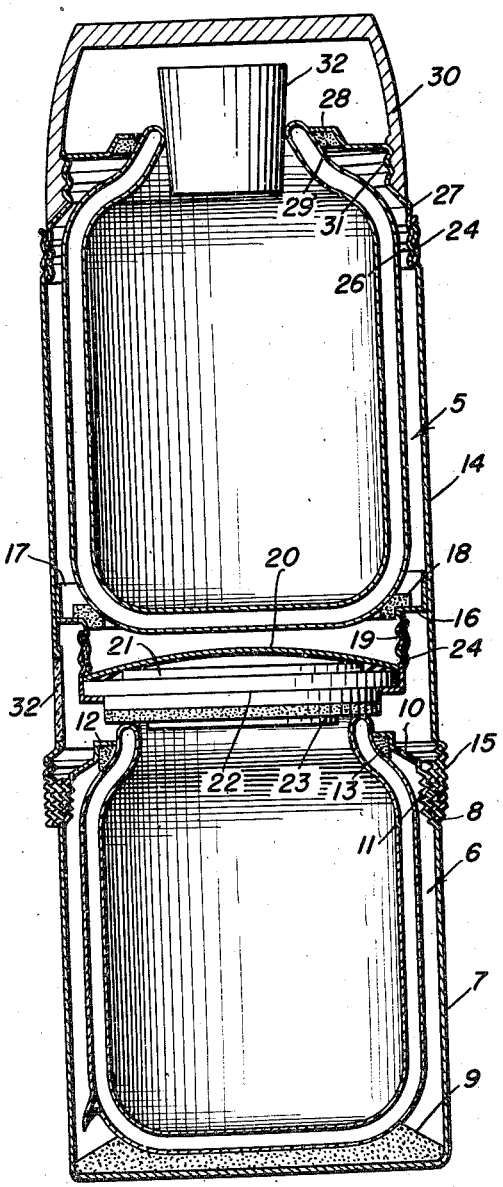
Figure 2 is a vertical sectional view, with certain parts in elevation.
Figure 1:
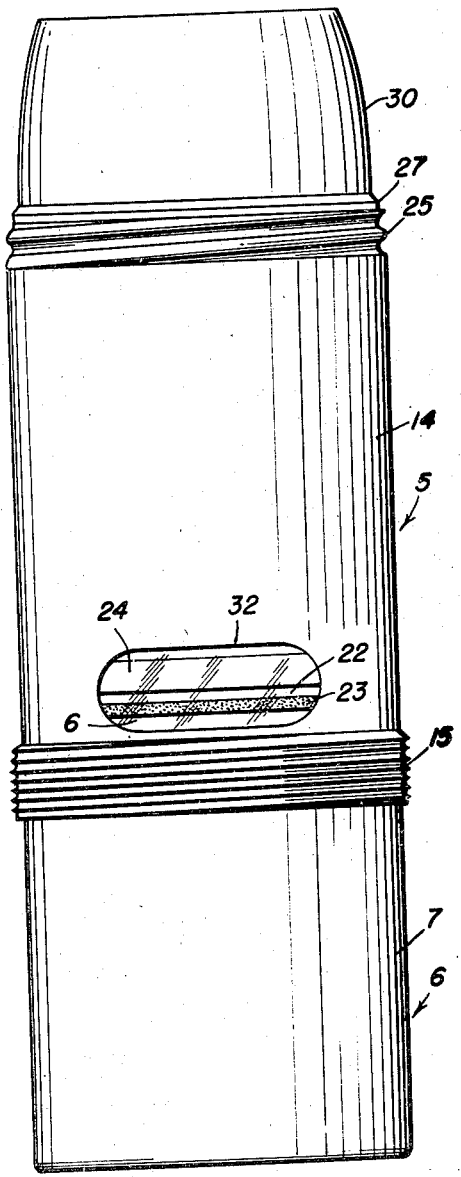
Figure 1 is an elevational view of a combination Thermos jar and bottle constructed in accordance with the principles of the present invention.

Referring now to the drawings by distinguishing reference numerals, it will be seen that the small necked bottle is denoted by the numeral 5, while the jar or jug is denoted by the numeral 6. These are of conventional construction, obviously. Each container is housed and properly confined in an individual protective jacket or casing. For example, the jar 6 is located within the confines of a cup-like receptacle 7, whose upper rim portion is screw-threaded, as at 8. A rubber or equivalent cushion 9 is fitted into the bottom of the receptacle and serves to effectively seat the bottom of the jar. The wide neck of the jar projects above the screw-threaded rim 8, where it is surrounded by an annular collar 10. The collar has a screw-threaded portion 11, which is screwed into the threads 8. The collar also has a lip 12 which serves to embrace and hold in place a rubber or equivalent packing ring. It is obvious, therefore, that the jar is properly jacketed in a sectional casing.

The bottle 5 is likewise encased in a substantially air-tight casing or jacket which comprises an open-ended cylinder 14 corresponding in diameter to the receptacle 7. The lower end of the cylinder is screw-threaded as at 15, and this is detachably connected with the threads 8. An annular ledge 16 is secured by a flange 17 to the interior of the cylinder and this is provided with a cushioning ring of rubber or the like 18, and provides a base for properly seating the Thermos bottle 5. It is also provided with a depending endless screw-threaded neck 19 having a concavo-convex diaphragm 20 and an attached packing ring 21. This serves to provide a proper support for the lid-type cover or closure 22 for the mouth of the jar. The cover is provided with a sealing ring 23 which rests in fluid-tight contact with the neck of the jar. The cover is also provided with an upstanding screw-threaded connector 24 which is detachably threaded on the neck 19. It follows, therefore, that the cover for the jar is carried by the cylinder 14 by way of the ledge 16, the ledge serving as a seating support for the bottle. It is also obvious that when the part 7 is screwed into the threads 15, the cover 22 comes into play to provide an effective closure for the neck of the jar.

The upper end-portion of the cylinder is screw-threaded, as at 25, to accommodate coacting threads 26 on a second collar 27. The collar 27 is annular and has a lip 28 surrounding the neck of the bottle and carrying a packing ring 29. The collar is also shaped to accommodate the plastic or equivalent cap or cup 30 and to this end, is provided with a second set of threads at 31, to permit the cap to be attached thereto. The neck of the bottle is closed by the customary cork stopper 32.

The cylinder 14 is provided on one side and at a predetermined point, with a sight opening or window 32 to permit the user to make sure that the parts are screwed together sufficiently tight to insure effective closing of the jar by the cover 22.

As stated, the two units are readily separable to facilitate initial filling and subsequent consumption of the food. Generally, the jar will be used to store and transport solid food such as potato salad, soup, ice cream, dessert and the like. On the other hand, the bottle is generally employed for storage of liquid food, particularly beverages such as coffee, milk, tea and the like.

Sectional and two-in-one Thermos bottles and jugs are not new, as previously stated, and for this reason, the novelty resides in the specific features which go to provide the special jacket and coacting parts which permits same to satisfactorily attain the desired ends.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

Having described the invention what is claimed as new is:

1. As a new article of manufacture and as a component part of an assemblage of the class described, a Thermos bottle, a casing externally jacketing the bottle, said casing embodying a cylinder which is open at its bottom, said open bottom portion being screw-threaded, said open bottom portion projecting well beyond the bottom of the bottle, an annular ledge provided with a packing ring, said ledge being secured on the interior of said cylinder and providing a partitioning and supporting member for the bottom of the bottle, said ledge embodying an endless screw-threaded depending neck, and a jar closing cover, said cover having a screw-threaded portion detachably threaded on said neck.

2. In a Thermos container construction of the class described, a Thermos bottle, a casing externally jacketing said bottle, said casing embodying a cylinder which is open at its bottom, said open bottom portion projecting well beyond the bottom of the bottle, an annular ledge supported in the intermediate portion of said cylinder, the bottom of said bottle being supported on said ledge, said ledge being provided with a depending annular screw-threaded neck, said neck being provided with a concavo-convex diaphragm, a jar closure, said closure being in contacting engagement with said diaphragm, said closure having an annular screw-threaded portion and said screw-threaded portion surrounding and being threadedly connected with said neck, said cover terminating on a plane inwardly of the lower end of said cylinder.

3. In a Thermos container construction of the class described, a Thermos bottle, a casing externally jacketing said bottle, said casing embodying a cylinder which is open at its bottom, said open bottom portion projecting well beyond the bottom of the bottle, an annular ledge supported in the intermediate portion of said cylinder, the bottom of said bottle being supported on said ledge, said ledge being provided with a depending annular screw-threaded neck, said neck being provided with a concavo-convex diaphragm, a jar closure, said closure being in contacting engagement with said diaphragm, said closure having an annular screw-threaded portion and said screw-threaded portion surrounding and being threadedly connected with said neck, said cover terminating on a plane inwardly of the lower end of said cylinder, together with a Thermos jar and a casing for said jar, the upper end-portion of said casing being screw-threaded and telescoped and threaded into the lower end-portion of said cylinder in a manner to permit the neck of the jar to come into sealing contact with the closure.

4. A combination Thermos bottle and jar comprising a Thermos jar, a casing enclosing said jar, said casing and jar being open at their normal upper ends, the upper end of said casing being screw-threaded, a second casing including removable closure means at its normal upper end and further including a cylinder, said cylinder being screw-threaded at its lower end and threadedly connected with the screw-threads on said first-named casing, an annular ledge mounted on the interior of the intermediate portion of said cylinder and spaced upwardly from the bottom of the cylinder and provided with a cushioning ring and further provided with a depending screw-threaded neck, a Thermos bottle mounted in said cylinder and having its bottom seated on said cushioning ring, a lid-like closure for the mouth of said Thermos jar, and means carrying said closure and threadedly connected with said neck.

MILES F. BIRD.

REFERENCES CITED

The following references are of record in the file of this patent:

UNITED STATES PATENTS

| Number | Name | Date |
|---|---|---|
| 1,001,850 | Hubert | Aug. 29, 1911 |
| 1,029,827 | Schuyler | June 18, 1912 |
| 1,132,512 | Carlson | Mar. 16, 1915 |
| 1,388,189 | Meikle | Aug. 23, 1921 |
| 1,421,325 | Walker | June 27, 1922 |
| 2,099,174 | Payson | Nov. 16, 1937 |

FOREIGN PATENTS

| Number | Country | Date |
|---|---|---|
| 286,757 | Italy | June 20, 1931 |